A. BOLES.
Cultivator.

No. 94,554.   Patented Sept. 7, 1869.

Witnesses:   Inventor:

UNITED STATES PATENT OFFICE.

ABRAM BOLES, OF KINDER, INDIANA.

IMPROVEMENT IN PLOWS.

Specification forming part of Letters Patent No. 94,554, dated September 7, 1869.

*To all whom it may concern:*

Be it known that I, A. BOLES, of Kinder, in the county of Hancock and State of Indiana, have invented a new and useful Improvement in Plows; and I do hereby declare that the following is a full, clear, and exact description thereof, which will enable others skilled in the art to make and use the same, reference being had to the accompanying drawings, forming part of this specification, in which—

Figure 1:
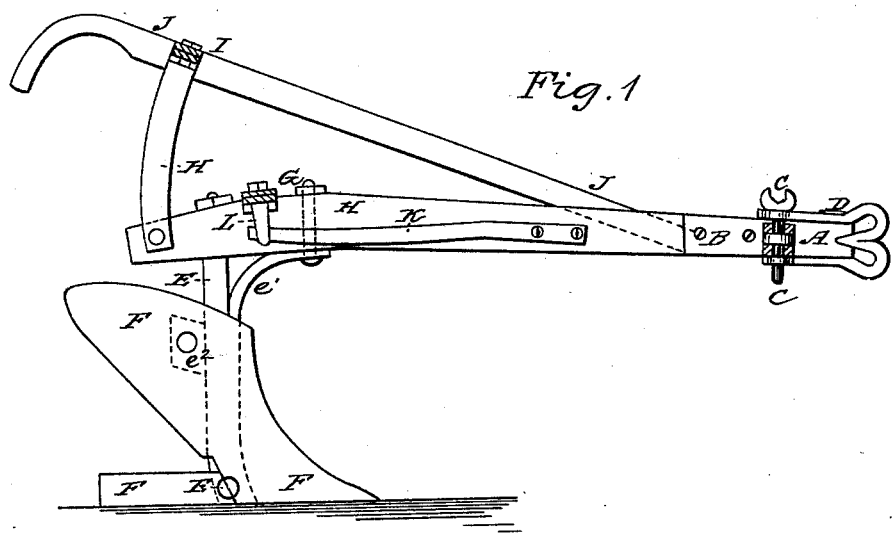
Figure 2:
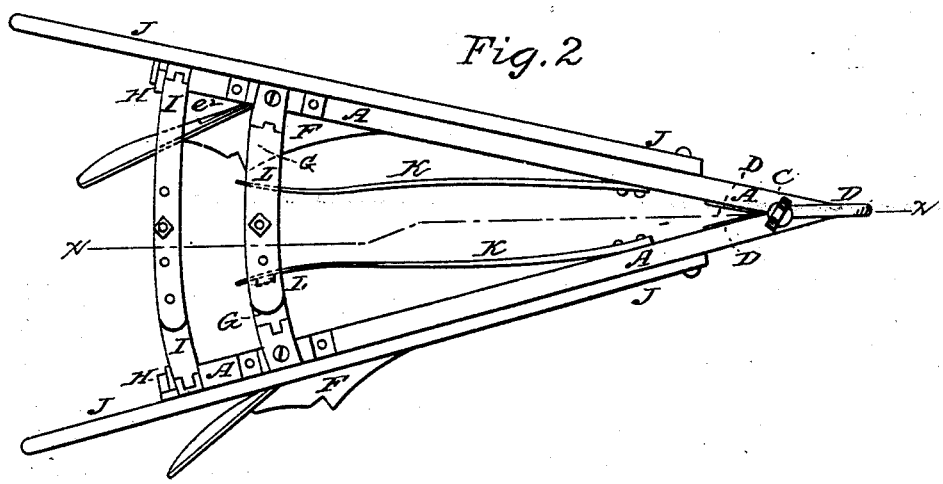

Figure 1 is a sectional view of my improved plow, taken through the line $x\ x$, Fig. 2. Fig. 2 is a top view of the same.

Similar letters of reference indicate corresponding parts.

My invention has for its object to furnish an improved plow, simple in construction, strong and durable, which may be readily adjusted for use as a single or double plow, and which may be attached to the frame-work of a buggy, for use as a gang-plow or cultivator; and it consists in the construction and combination of the various parts, as hereinafter more fully described.

A are the plow-beams, the forward ends of which are beveled off upon their inner sides, as shown in Fig. 2.

To the inner sides of the forward parts of the plow-beams A are attached plates B, having eyes formed upon them, which interlock with each other in such a way that the bolt or pin C of the clevis D may pass through them to connect and hinge the forward ends of the plow-beams A to each other, so that the rear ends of said beams, to which the plows are attached, may be readily moved farther apart or closer together, as may be desired.

E are the plow-standards, the upper ends of which are securely attached to the rear parts of the beams A, and which are strengthened by curved or inclined forwardly-projecting braces $e'$, as shown in Fig. 1.

F are the plows, the landsides of which are bolted to the lower ends of the standards E, and the mold-boards of which are bolted to ears $e^2$, formed upon or securely attached to the said standards E.

G are bars which overlap each other, and the outer ends of which are hinged to plates or short bars securely attached to the rear parts of the plow-beams A. Each of the bars G has one or more holes formed through it to receive the coupling-bolt, so that the plows may be adjusted to work farther apart or closer together by changing the said bolt from one to the other of said holes.

To the rear ends of the plow-beams A are rigidly and securely attached the lower ends of the uprights H, to the upper ends of which are hinged the outer ends of the bars I, the inner parts of which overlap each other, and have one or more holes formed through them to receive the coupling-bolt, so that they may be conveniently adjusted to correspond with the adjustment of the bars G.

J are the handles, the forward ends of which are detachably bolted to the forward parts of the beams A, and the rear ends of which are detachably bolted to the upper ends of the uprights H.

To the inner sides of the middle parts of the plow-beams A are attached the forward ends of the springs K, which extend inward and rearward, and the rear or free ends of which rest against the projections L, formed upon or attached to the under sides of the bars G, as shown in Figs. 1 and 2, to give sufficient rigidity to the plow while being used. By this construction the plows may be conveniently used singly or doubly, or they may be attached to a suitable buggy-frame and used as a cultivator or gang-plow, thus making the plow easily adjustable for use in different ways and for various purposes.

Having thus described my invention, what I claim as new, and desire to secure by Letters Patent, is—

1. Hinging the beveled forward ends of the plow-beams A to each other by means of the eye or hinge plates B and clevis C D, substantially as herein shown and described, and for the purpose set forth.

2. Adjustably connecting the rear parts of the plow-beams A to each other by the adjustable overlapping hinged bars G, uprights H, and overlapping adjustable hinged bars I, substantially as herein shown and described, and for the purpose set forth.

3. The combination of the springs K and projections L with the plow-beams A and adjustable overlapping hinged bars G, substantially as herein shown and described, and for the purpose set forth.

ABRAM BOLES.

Witnesses:
B. F. FRY,
JOHN W. DYE.